United States Patent [19]

Peterson et al.

[11] Patent Number: 5,267,635
[45] Date of Patent: Dec. 7, 1993

[54] CLUTCH ACTUATOR SYSTEM

[75] Inventors: David C. Peterson, Walled Lake; Keith V. Leigh-Monstevens, Rochester Hills, both of Mich.

[73] Assignee: Automotive Products plc, Warwickshire, England

[21] Appl. No.: 912,726

[22] Filed: Jul. 13, 1992

[51] Int. Cl.[5] .............................................. F16D 23/12
[52] U.S. Cl. ..................................... 192/84 R; 192/90; 192/94; 192/99 S
[58] Field of Search ................. 192/84 R, 90, 94, 99 S

[56] References Cited

U.S. PATENT DOCUMENTS

| | | | |
|---|---|---|---|
| 2,072,832 | 3/1937 | Weydell | 192/90 X |
| 3,235,045 | 2/1966 | Pop | 192/84 X |
| 3,411,611 | 11/1968 | Powell | 192/94 X |
| 3,507,374 | 4/1970 | Allaben, Jr. | 192/94 X |
| 4,648,498 | 3/1987 | Herbulot et al. | 192/94 |
| 4,766,985 | 8/1988 | Brusasco | 192/90 X |
| 4,865,173 | 9/1989 | Leigh-Monstevens et al. | 192/90 X |
| 4,976,347 | 12/1990 | Sakakibara et al. | 192/94 X |
| 4,981,202 | 1/1991 | Leigh-Monstevens | 192/92 |
| 5,119,913 | 6/1992 | Focqueur et al. | 192/90 X |

FOREIGN PATENT DOCUMENTS

| | | |
|---|---|---|
| 3438594 | 4/1986 | Fed. Rep. of Germany . |
| 2-62429 | 3/1990 | Japan ................................... 192/90 |
| 2124321A | 2/1984 | United Kingdom . |
| 2204374A | 11/1988 | United Kingdom . |

OTHER PUBLICATIONS

Automotive Engineering, "Electronic Actuator Eliminates Clutch Pedal", Oct. 1984.

Primary Examiner—Richard M. Lorence
Attorney, Agent, or Firm—Krass & Young

[57] ABSTRACT

A clutch actuation system for use in engaging and disengaging the clutch of a manual transmission motor vehicle. The system includes a sensor sensing the rotary movement of the clutch pedal, an electric motor having a screw output shaft driving a ball nut mechanism engaging a clutch release member, a further sensor sensing the position of the ball nut mechanism and thereby of the clutch release member, and an electronic control module. The module compares the magnitude of the position signal received from the clutch pedal position sensor to the magnitude of the position signal received from the ball nut position sensor and operates in a closed-loop servo manner to move the clutch release member via the electric motor through a distance proportioned to the extent of pivotal movement of the clutch pedal so that the operator, by precise control of the extent of pivotal movement of the clutch pedal, can precisely control the extent of engagement or disengagement of the clutch. Return movement of the system to the clutch engaged position is preferably accomplished by back driving the ball nut and motor via the clutch diaphragm spring.

5 Claims, 3 Drawing Sheets

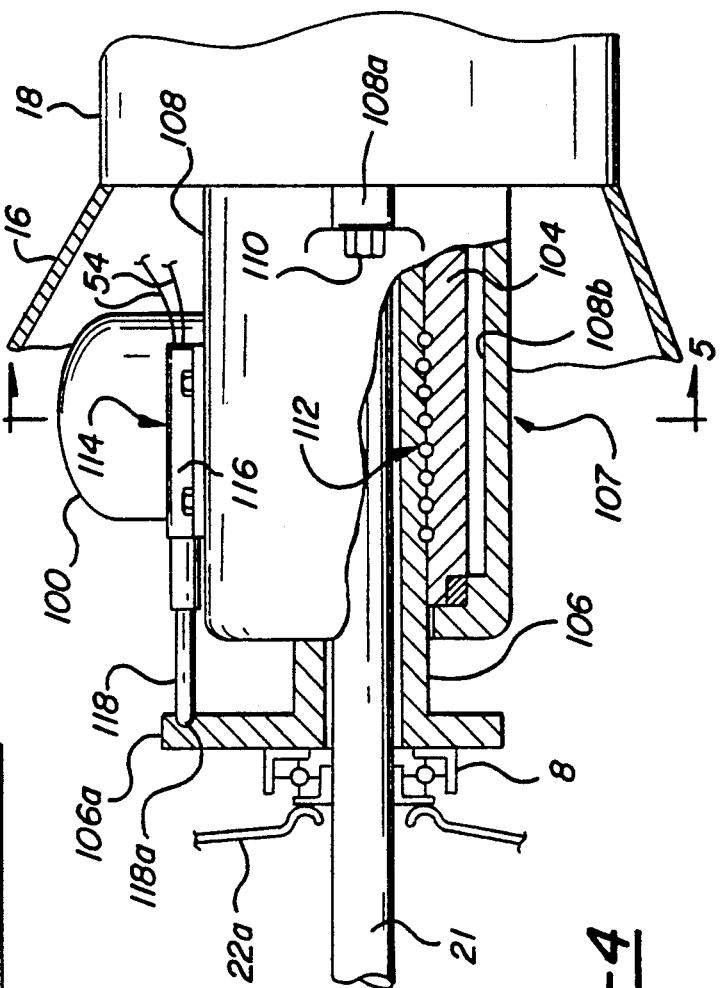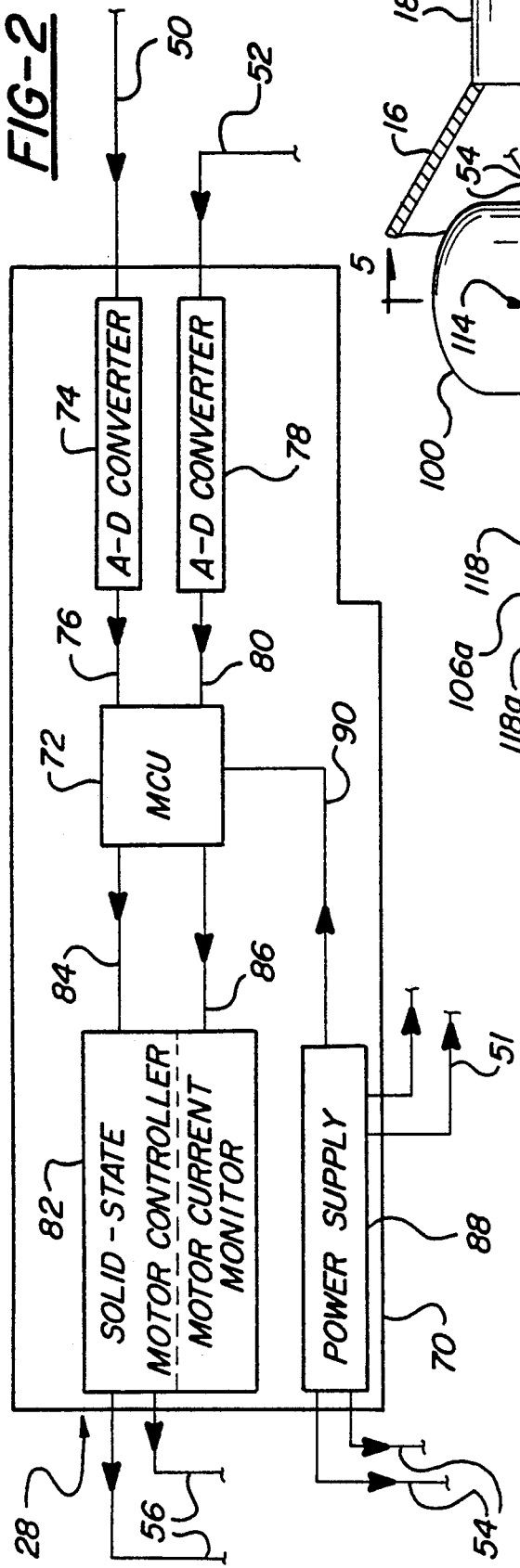

CLUTCH ACTUATOR SYSTEM

BACKGROUND OF THE INVENTION

This invention relates for clutch assemblies for motor vehicles and more particularly to clutch actuator systems for such a clutch assembly.

Internal combustion engines require some manner of device to bridge the gap between fly wheel and gear box input speeds when the vehicle begins to move. Such devices, with the ability to slip in a controlled manner, have taken many forms including disk clutches and torque converters. The torque converter allows two pedal driving and provides smooth operation. However, it exhibits constant slip even in high speeds with associated fuel economy disadvantages. The manual disk clutch by contrast is rugged and inexpensive and does not slip during normal operation but requires attention and effort on the driver's part. In an attempt to eliminate some of the driver effort associated with a manual clutch, various actuator devices have been proposed which operate in response to a driver's signal to engage and disengage the clutch, thereby relieving the driver of the clutching and declutching effort. However, the prior art clutch actuators have either not effectively carried out the clutching and declutching operations, have been complicated and prohibitively expensive, or have required unacceptable levels of maintenance with associated warranty problems.

SUMMARY OF THE INVENTION

This invention is directed to the provision of a clutch actuator system which is effective in operation, inexpensive, and reliable over sustained periods of usage.

The invention clutch actuator system is intended for use with a clutch having a clutch shaft and a clutch release member operative when actuated to engage and disengage the clutch and includes input signal means operative in response to operator movement of the control member to generate an electrical input signal indicative of a desire to disengage the clutch and control means operative in response to receipt of the input signal to actuate the release member. According to the invention, the control means includes an electric motor receiving the electrical input signal and having an output shaft rotatable about an axis displaced from the rotational axis of the clutch shaft, and a screw and nut assembly drivingly interconnecting the output shaft of the motor and the clutch release member. This arrangement provides a simple, inexpensive and effective means of converting the electrical input signal to the movement of the clutch release member.

According to a further feature of the invention, the input signal means includes a position sensor sensing the position of the control member and operative to generate an input signal proportioned to the movement of the control member and the control means includes means sensing the position of the clutch release member and comparator means comparing the magnitude of the input signal to the extent of movement of the clutch release member. This arrangement provides a simple, closed-loop servo arrangement to facilitate operation of the system.

According to a further feature of the invention, the means sensing the position of the control member comprises a position sensor fixedly mounted with respect to the electric motor and sensing the position of an element of the screw and nut assembly. This arrangement provides a compact and efficient package for the system.

In one embodiment of the invention, the clutch release member comprises a clutch release lever projecting out of the housing of the clutch and the electric motor is positioned exteriorly of the clutch housing in operative engagement with the clutch release member.

In another embodiment of the invention, the clutch release member comprises a clutch release bearing positioned around the clutch shaft, the electric motor is positioned within the clutch housing, the nut and screw and positioned concentrically around the clutch shaft, the exterior of the nut is configured as a worm wheel, and the output shaft of the output motor comprises a worm gear drivingly engaging the worm wheel.

BRIEF DESCRIPTION OF THE DRAWINGS

FIG. 2 is a block diagram showing a control module utilized in the invention clutch actuator system;

FIG. 4 is a detailed view of the actuator system of FIG. 3; and

DETAILED DESCRIPTION OF THE PREFERRED EMBODIMENTS

Figure 1:
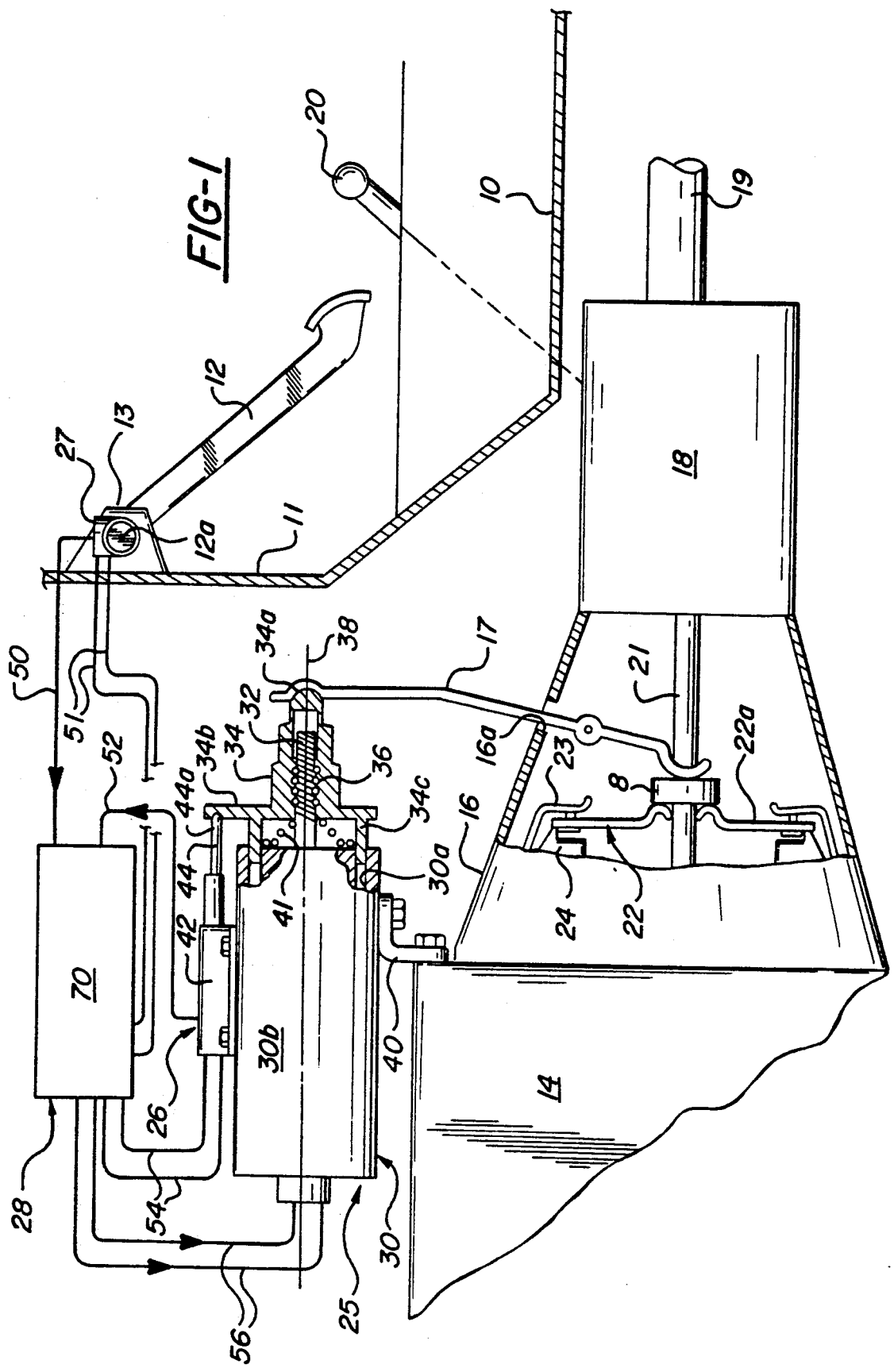
FIG. 1 is a fragmentary somewhat schematic view of a motor vehicle employing a first embodiment of the invention clutch actuator system.

The invention clutch control system is illustrated in FIG. 1 in association with a motor vehicle of the type including a floorboard 10; a fire wall 11; a clutch pedal 12 pivotally mounted on a bracket 13 secured to the fire wall 11; an internal combustion engine 14; a disc clutch contained in a clutch bell housing 16 and including a clutch release lever 17 passing in known manner through an opening 16a in clutch bell housing 16 for coaction with a clutch release bearing 8 to engage and disengage the clutch in response to pivotal movement of lever 17; a gearbox 18; a drive shaft 19; and a shift lever 20 operative in known manner to effect a gear change within gearbox 18 in response to operator movement of the shift lever in conjunction with disengagement and subsequent reengagement of the clutch. Clutch release bearing 8 is slidably mounted on clutch shaft 21 and coacts in known manner with the spring fingers 22a of a diaphragm spring 22, mounted on a cover 23 secured to the flywheel of the vehicle, to move a pressure plate 24 into and out of engagement with a friction disk to engage and disengage the clutch.

The FIGS. 1-2 embodiment of the invention clutch actuator system includes an actuator 25, a position sensor 26, a further position sensor 27, and a control module 28.

Actuator 25 comprises a high efficiency permanent magnet DC motor 30 including a screw output shaft 32 driving a ball nut 34 through a recirculating ball screw mechanism 36 of known form so that nut 34 moves linearly along the axis 38 of shaft 32 in response to energization of the motor 30. The front or leading end 34a of nut 34 has a rounded or ball configuration for receipt in a socket 17a defined at the upper end of clutch release lever 17. Nut 34 further includes a rear flange portion 34b and a plurality of circumferentially spaced guide rods 34c extending rearwardly from flange portion 34b and slidably and linearly guiding in guide bores 30a provided in the front face of the housing 30b of the electric motor. Motor 30 is secured to engine 14 and/or clutch bell housing 16 by a bracket 40. It will be seen that energization of the motor 30 results in axial movement of nut 34 along the axis 38 of the motor with resultant pivotal movement of clutch release lever 17. Motor 30 preferably has a horsepower rating of 0.120 and a torque rating of 8.5 lbs - ins. at 900 rpms, and is preferably a BD type motor available from Globe Motors Division of Labinal Components and Systems, Inc. of Dayton, Ohio.

A conical preload spring 41 is positioned between the rear face of nut 34 and the front face of the motor housing to provide a predetermined load between the release lever and the clutch diaphragm spring.

Position sensor 26 is secured to the top of housing 30b of motor 30 and includes a main body housing portion 42 and a probe 44 connected at its front end 44a to nut flange 34b so that the probe 44 linearly follows the linear movement of the nut and therefore assumes a position at all times that is representative of the linear position of the nut and the pivotal position of clutch release member 17. Sensor 26 may be of the potentiometer type, the Hall effect type, the optical type, or the LVDT type. The sensor is required to measure approximately 12-15 millimeters of travel for clutch disengagement and must also be able to compensate 12-15 millimeters for clutch wear. Sensor 26 may, for example, be of the type available from Nartron Corp. of Reed City, Mich. as Part No. 4114119.

Position sensor 27 is secured to clutch pedal bracket 13 and is arranged to sense the pivotal movement of clutch pedal 12. Sensor 27 may also be of the potentiometer type, the Hall effect type, the optical type, or the LVDT type and is required to measure approximately 60-85 degrees of rotation of the clutch pedal. Sensor 27 may, for example, be of the type available from Nartron Corp. of Reed City, Mich. as Part No. 4114019-1.

Electronic control module 28 is preferably suitably mounted in the engine compartment of the vehicle and is connected to sensor 27 by an input lead 50 and power leads 51, to sensor 26 by an input lead 52 and power leads 54, and to motor 30 by power leads 56.

Control module 28 includes a housing 70; a microprocessor control unit 72 including internal analog/digital converter 74 connected to sensor input lead 50 and a further internal analog/digital converter 78 connected to sensor input lead 52; a solid state motor controller/motor current monitor 82 connected to power leads 56 and to control unit 72 by leads 84,86; and a power supply 88 connected to power leads 51,54 and connected to control unit 72 by a lead 90.

In operation, with the clutch in an engaged position, the operator's desire to disengage the clutch is indicated by pivotal movement of the clutch pedal 12 about the clutch pedal axis 12a. The extent of the pivotal movement is sensed by the sensor 27 which generates an output signal on lead 50 proportioned to the extent of pivotal movement of the clutch pedal. The output signal is inputted on lead 50 to control module 28 where the input signal is compared to the input signal from the position sensor 26. Since at this time the sensor 26 is indicating a position of the lever 17 corresponding to full clutch engagement, the control module generates an output signal on power lines 56 to motor 30 to energize the motor in a sense to drive the motor screw shaft in a direction to move the nut 34 linearly to the right as viewed in FIG. 1, whereby to pivot the clutch release lever 17 in a direction to begin disengagement of the clutch in known manner by movement of the clutch release bearing against the diaphragm spring fingers of the clutch.

As the nut moves to the right, probe 44 follows the movement of the nut, thereby constantly changing the output signal generated on lead 52 to the control module. The control module constantly compares the signal being received on lead 50 from sensor 27 to the signal being received on lead 52 from the sensor 26 and, in closed-loop fashion, terminates the energization of the motor 30 at such time as the signals are determined to be equal. Thus, a slight amount of pivotal movement of clutch pedal 14 will result in a correspondingly slight amount of pivotal movement of lever 17 and a larger amount of pivotal movement of clutch pedal 14 will result in a larger amount of pivotal movement of release lever 17 so that the operator can precisely control the extent of disengagement (or engagement) of the clutch since the clutch position will always correspond exactly to the position of the clutch pedal.

After the lever 17 has reached a position corresponding to the position of the clutch pedal, the control module pulse width modulates the motor to hold the ball nut 34 in its instantaneous position and thereby maintain the clutch in its instantaneous position of engagement or disengagement.

Preferably the system is arranged such that the motor 30 powers the nut 34 and thereby the release lever 17 only in the clutch disengage direction with return movement of the clutch to its engaged position being accomplished by back driving of the nut and motor via the force supplied by the diaphragm spring 22 of the clutch but with sensors 26 and 27 continuing to be operative during the clutch engagement movement so that the extent of movement of the clutch back towards its engaged position is proportioned to the extent of pivotal movement of the clutch pedal back toward its engaged position. Thus, as the diaphragm spring 22 reverse drives the nut and motor to allow the clutch to return to its engaged position, the speed and extent of engagement is constantly under the control of the operator by virtue of the constant comparison of input signals going on within the module 28 as between the inputs from the sensor 26 and the sensor 27.

This one-way driving arrangement simplifies the motor driver circuit since the motor only has to be powered in one direction, i.e., the disengaging direction. Accordingly, if all electrical power is lost, the clutch assumes a fail-safe engaged position so as to provide the driver with "limp home" capability. The one-way drive also allows the system to be self-adjusting to compensate for wear during the life of the clutch.

Alternatively, it may be desirable to power the motor back during clutch engagement and capture potential energy in an assist spring to be used during a subsequent clutch disengagement. This would allow the motor to be downsized to reduce system costs.

Ideally, the non-linear profile of the diaphragm spring of the clutch can be programmed into the software's algorithms that control the motor and driver circuit. This would involve adjusting the pulse width modulation to drive the motor at optimum speed and acceleration for a given clutch pedal travel input. Obviously, the software can be written to tailor the performance for any type of clutch and is not limited to a conventional diaphragm spring clutch.

An access port (not shown) can also be provided to manually turn the motor shaft to disengage the clutch if an electrical power system failure occurs. Although the motor 30 is shown as directly driving the nut 34 via output screw 32, it will be understood that the nut 32 may be driven from the motor through a gear reduction set to enable further reduction of the motor size.

Although the system has been described as being initiated by operator depression of the clutch pedal 14, the system may also be arranged to respond to an input signal generated by operator movement of the gear shift lever 30. In this arrangement, the sensor 27, rather than sensing the pivotal position of the clutch pedal 12, would sense the instantaneous position of the gearshift lever 20 and generate an output signal for transmittal to the control module for comparison to the position signal being generated by the position sensor 26. With this arrangement, and if desired, the clutch pedal could be eliminated totally from the vehicle.

Figure 5:
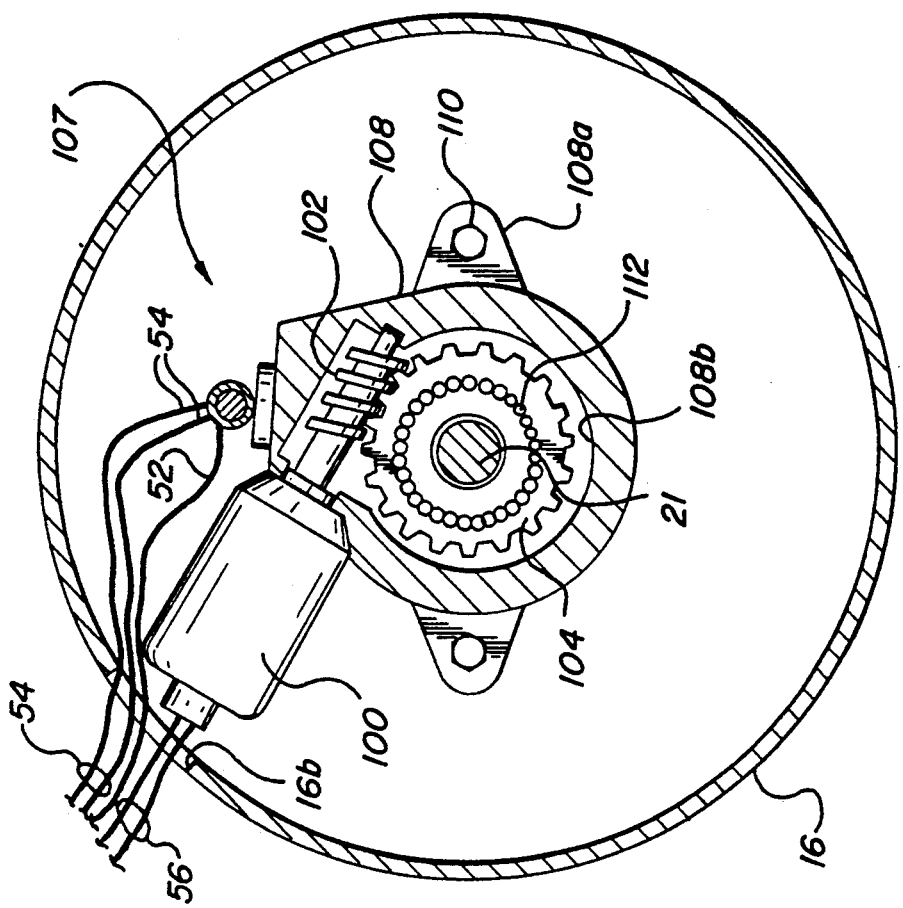
FIG. 5 is a cross-sectional view taken on line 5—5 of FIG. 4.
Figure 3:
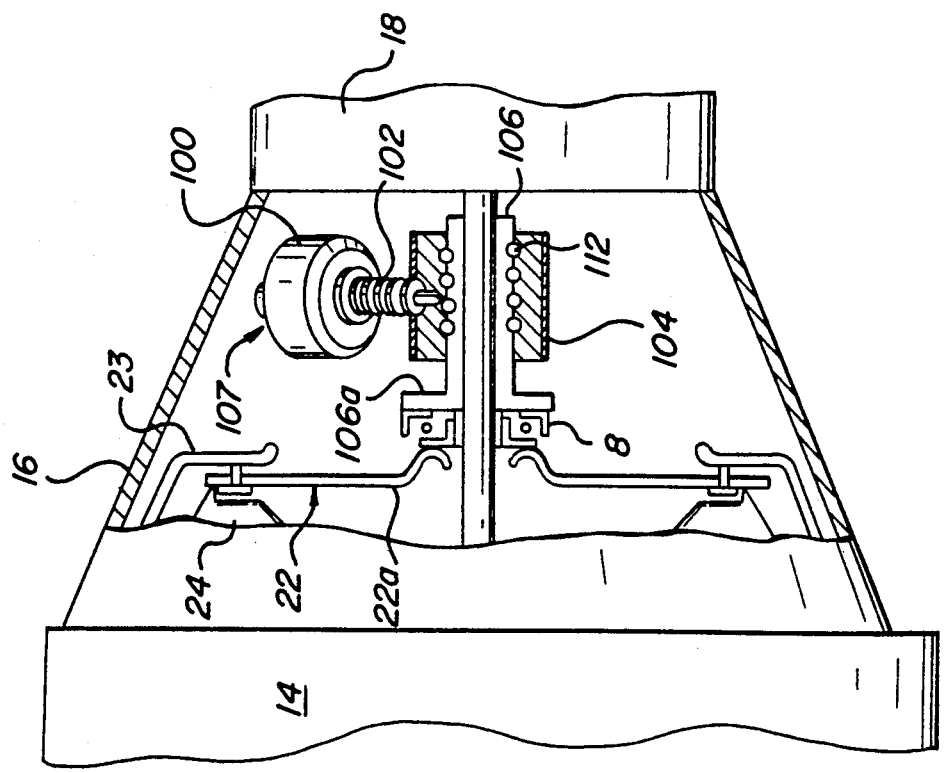
FIG. 3 is a fragmentary somewhat schematic view of a second embodiment of the invention clutch actuator system.

The second embodiment of the invention clutch actuator system, shown in FIGS. 3–5, is generally similar to the FIGS. 1-2 embodiment with the exception that the electric motor 100 of the actuator 107 is positioned within the clutch housing 16 and includes a worm gear output shaft 102 drivingly engaging a worm wheel nut 104 which in turn threadably drives an annular screw 106 positioned in surrounding relation to clutch shaft 21 and engaging clutch release bearing 8 so that energization of motor 100 drives worm gear output shaft 102 which in turn rotates worm wheel nut 104 to cause annular screw 106 to move linearly along the axis of clutch shaft 21 to engage and disengage the clutch in coaction with release bearing 8, diaphragm spring 22 and pressure plate 24.

The FIGS. 3–5 embodiment is shown schematically in FIG. 3 and in detail in FIGS. 4 and 5.

As seen in FIGS. 4 and 5, the actuator 107 includes a hollow housing 108 positioned within clutch housing 16 in surrounding relation to clutch shaft 21 by bolts 110 passing through housing lugs 108a for engagement with the front end wall of gear box 18.

Specifically, motor 100 is mounted to housing 108 with its worm gear output shaft 102 passing into the hollow interior 108b of the housing and journalled in the housing; worm wheel nut 104 is journalled in the housing within housing hollow 108b in concentric surrounding relation to annular screw 106 and clutch shaft 21; annular screw 106 is positioned within nut 104 in surrounding relation to clutch shaft 21 and is driven by nut 104 through a recirculating ball screw mechanism 112 of known design; the front end of screw 106 projects out of the housing 108 and terminates in a radial flange 106a; and a position sensor 114 (corresponding in all respects to the position sensor 26 of the FIGS. 1–2 embodiment) is mounted on housing 106 and includes main body housing portion 116 and a probe 118 connected at its front end 118a to nut flange 106a so that the probe 118 linearly follows the linear movement of screw 106 and therefore assumes a position at all times that is representative of the linear position of the screw.

It will be understood that the actuator 107 of the FIGS. 3–5 embodiment is utilized with the position sensor 27 and the control module 28 with the position sensor 114 and actuator 107 substituting for the position sensor 26 and actuator 25. Leads 52 and 54 from control module 28 pass through an opening 16b in clutch housing 16 for connection to position sensor 114 and leads 56 from control module 28 pass through opening 16b for connection to motor 100.

In operation, with the clutch in an engaged position, the operator's desire to disengage the clutch is indicated by pivotal movement of the clutch pedal 12 about the clutch pedal axis 12a. The extent of the pivotal movement is sensed by the senor 27 which generates an output signal on lead 50 proportioned to the extent of pivotal movement of the clutch pedal. The output signal is inputted on lead 50 to control module 28 where the input signal is compared to the input signal from the position sensor 114. Since at this time the sensor 114 is indicating a position of the clutch release bearing 8 corresponding to full clutch engagement, the control module generates an output signal on power lines 56 to motor 100 to energize the motor in a sense to drive the motor screw shaft in a direction to move the screw 106 linearly to the left as viewed in FIG. 4 whereby to move clutch release bearing 8 in a direction to begin disengagement of the clutch in known manner by movement of the clutch release bearing against the diaphragm spring fingers of the clutch.

As the screw 106 moves to the left, probe 118 follows the movement of the screw, thereby constantly changing the output signal generated on lead 52 to the control module. The control module constantly compares the signal being received on lead 50 from the sensor 114 to the signal being received on lead 52 from the sensor 27 and, in closed loop fashion, terminates the energization of the motor 100 as such time as the signals are determined to be equal. Thus, a slight amount of pivotal movement of clutch pedal 14 will result in a correspondingly slight amount of linear movement of clutch release bearing 8 and a larger amount of pivotal movement of clutch pedal 14 will result in a larger amount of linear movement of clutch release bearing 8 so that the operator can precisely control the extent of disengagement (or engagement) of the clutch since the clutch position will always correspond exactly to the position of the clutch pedal.

After the clutch release bearing 8 has reached a position corresponding to the position of the clutch pedal, the control module pulse width modulates the motor to hold the screw 106 in its instantaneous position and thereby maintain the clutch in its instantaneous position of engagement or disengagement.

As with the FIGS. 1–2 embodiment, the system preferably is arranged such that the motor 100 powers the screw 106 and thereby the clutch release bearing 8 only in the clutch disengage direction with return movement of the clutch to its engaged position being accomplished by back driving of the nut and motor via the force supplied by the diaphragm spring 22 of the clutch but with sensors 114 and 27 continuing to be operative during the clutch engagement movement so that the extent of movement of the clutch back to its engaged position is proportioned to the extent of pivotal movement of the clutch pedal back to its engaged position.

Although preferred embodiments of the invention have been illustrated and described in detail, it will be apparent that various changes may be made in the disclosed embodiments without departing from the scope or spirit of the invention.

We claim:

1. A clutch actuator system for use with a clutch having a clutch shaft and a clutch release member operative when actuated to engage and disengage the clutch, the actuator system including input signal means operative in response to operator movement of a control member to generate an electrical input signal indicative of a desire to disengage the clutch and control means operative in response to receipt of the input signal to actuate the release member, characterized in that the clutch includes a clutch housing; the clutch release member comprises a clutch release lever projecting out of the clutch housing to define a free end outside of the clutch housing; the input signal generated by the input signal means is an electrical signal proportioned to the position of the control member; the control means includes means generating an electrical position signal proportioned to the position of the clutch release lever, means comparing the input signal and the position signal and operative in response to a sensed difference in the input and position signals to generate an electrical output signal, and an electrical motor positioned outside of the clutch housing, receiving the electrical output signal, having an output shaft rotatable about an axis displaced from the rotational axis of the clutch shaft, and having a screw element and nut element assembly drivingly interconnecting the output shaft of the motor and the free end of the clutch release lever; and the electrical position signal generating means comprises a release lever position sensor mounted outside the clutch housing proximate the electrical motor and including a probe engaging one of said elements.

2. An actuator according to claim 1 wherein the electric motor has a screw output shaft constituting the screw element of the screw and nut assembly.

3. An actuator according to claim 1 wherein the release member position sensor senses the position of the nut element.

4. An actuator according to claim 1 wherein the control member is a clutch pedal and the input signal means senses the extent of pivotal movement of the clutch pedal.

5. A clutch actuator system for use with a motor vehicle having a clutch pedal and a clutch having a clutch shaft and a clutch release member operative when actuated to engage and disengage the clutch, said system comprising:
   an electric motor;
   a screw and nut assembly, including a screw element and a nut element, driven by the electric motor and adapted to drivingly engage the clutch release member; and
   a position sensor tracking the position of one of said elements and generating a position signal having a value that varies continuously in proportion to the position of said one element;
   said position sensor being fixedly positioned with respect to the electric motor and including a probe engaging said one element;
   said electric motor including a screw output shaft constituting said screw element;
   said nut element being threadedly mounted on said screw output shaft and engaging the clutch release member;
   said probe engaging the nut element;
   said nut element including guide rods slidably received in guide bores provided in the housing of the electric motor.

* * * * *